United States Patent
Kitagawa

(10) Patent No.: US 7,503,308 B2
(45) Date of Patent: Mar. 17, 2009

(54) FUEL INJECTION AND IGNITION CONTROL METHOD AND FUEL INJECTION AND IGNITION CONTROL DEVICE OF ENGINE

(75) Inventor: Yuichi Kitagawa, Shizuoka-ken (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/970,117

(22) Filed: Jan. 7, 2008

(65) Prior Publication Data
US 2008/0183369 A1  Jul. 31, 2008

(30) Foreign Application Priority Data
Jan. 10, 2007  (JP)  ............... 2007-002436

(51) Int. Cl.
*F02D 1/00* (2006.01)
*F02P 5/00* (2006.01)
(52) U.S. Cl. ............ 123/325; 123/339.11; 123/406.23; 123/406.5; 123/406.51
(58) Field of Classification Search ............ 123/325, 123/326, 329, 332, 339.11, 406.23, 406.27, 123/406.5, 406.51, 406.53; 701/103, 104
See application file for complete search history.

(56) References Cited

U.S. PATENT DOCUMENTS 7,322,342 B2 *  1/2008  Maemura et al. ............ 123/491

| | | | |
|---|---|---|---|
| 2003/0012990 A1 * | 1/2003 | Yamanashi | 429/24 |
| 2005/0252491 A1 * | 11/2005 | Oono et al. | 123/477 |
| 2006/0046896 A1 * | 3/2006 | Nakajima et al. | 477/107 |
| 2006/0048734 A1 * | 3/2006 | Kataoka et al. | 123/179.4 |

FOREIGN PATENT DOCUMENTS

JP  54-145819 A  11/1979

* cited by examiner

*Primary Examiner*—John T Kwon
(74) *Attorney, Agent, or Firm*—Pearne & Gordon LLP

(57) ABSTRACT

A fuel injection and ignition control method including the steps of: calculating a total injection amount correction value at the restart of fuel injection by adding an injection amount correction value determined with respect to a fuel cut period and an engine operating state to an injection amount increase correction value in acceleration when an engine accelerating operation is performed in a state where fuel cut is performed and the engine is operated; determining an injection restart time ignition timing delay amount with respect to the total injection amount correction value and a throttle valve opening degree; and performing fuel injection control to increase a fuel injection amount to be higher than a fuel injection amount in normal time by the total injection amount correction value, and ignition control to delay ignition timing from ignition timing in normal operation by the injection restart time ignition timing delay amount.

5 Claims, 4 Drawing Sheets

FUEL INJECTION AND IGNITION CONTROL METHOD AND FUEL INJECTION AND IGNITION CONTROL DEVICE OF ENGINE

TECHNICAL FIELD OF THE INVENTION

The present invention relates to a fuel injection and ignition control method for controlling fuel injection and ignition of an engine, and a fuel injection and ignition control device used for implementing the method.

PRIOR ART OF THE INVENTION

As disclosed in Japanese Patent Application Laid-Open No. 54-145819, in a vehicle or the like including an engine, fuel injection is stopped to cut fuel in deceleration of the engine for saving fuel consumption or cleaning exhaust gas.

When a predetermined fuel cut stop condition is met after the fuel cut, the fuel cut is stopped to perform "fuel cut stop time injection restart control" to restart fuel injection. While the fuel cut is performed, an amount of fuel attached to a wall surface of an intake pipe is reduced. Thus, when the fuel cut is stopped to restart the fuel injection, most of injected fuel is used for forming a liquid film on a liquid surface of the intake pipe, and an air/fuel ratio of an air/fuel mixture becomes lean. Thus, in the fuel cut stop time injection restart control, a fuel injection amount is increased to be higher than a fuel injection amount in normal time by "a fuel cut stop time injection amount correction value".

However, if the fuel injection amount is increased when the fuel cut is stopped to restart the fuel injection, an output torque of the engine is rapidly increased to cause a torque shock in some cases. Thus, in the device disclosed in Japanese Patent Application Laid-Open No. 54-145819, when the fuel injection is restarted, fuel cut stop time ignition control is performed to delay ignition timing of the engine from ignition timing in normal time by "a predetermined injection restart time ignition timing delay amount", and then gradually advance the ignition timing with time to be returned to the ignition timing in normal time, thereby preventing a rapid increased in an output torque and preventing a torque shock.

In an engine to which fuel is supplied by a fuel injection device, when an accelerating operation is performed, "acceleration time injection amount increase control" is performed to control the fuel injection device so as to increase a fuel injection amount by "an acceleration time injection amount correction value".

In an engine included in a vehicle or the like, an accelerating operation is often suddenly performed from a deceleration state. When the accelerating operation is performed, a throttle valve is suddenly opened to increase an intake air amount. Thus, for obtaining an appropriate air/fuel ratio of an air/fuel mixture, an amount of fuel supplied to the engine needs to be increased.

As described above, when the fuel cut is stopped to restart the fuel injection, the control is performed to increase the fuel injection amount to be higher than the fuel injection amount in normal time by the fuel cut stop time injection amount correction value, and when the engine is accelerated, the acceleration time injection amount increase control to increase the fuel injection amount is performed. When the accelerating operation of the engine is performed during the fuel cut, the amount of fuel may become insufficient even if the fuel injection amount is increased by the sum of an increment of the injection amount in the normal fuel cut stop time injection restart control and an increment of the injection amount in the acceleration time injection amount increase control. Such a state noticeably occurs when the fuel cut is performed for a long time.

An insufficient amount of fuel supplied to the engine at the restart of the fuel injection causes the air/fuel mixture to become lean, and thus the engine cannot be accelerated according to a driver's intention, which impairs operating performance. If the air/fuel mixture becomes lean, the engine may seize up at worst.

To avoid the above described state, it is supposed that the fuel injection amount at the restart of the fuel injection is sufficiently increased. However, if the fuel injection amount at the restart of the fuel injection is increased more than necessary, the air/fuel mixture becomes too rich when the fuel injection is restarted in a state where the fuel cut is performed for a short time and the amount of fuel attached to the wall of the intake pipe is not so much reduced, which impairs an exhaust gas component, or reduces operating performance because of an insufficient output torque of the engine.

In the conventional technique, the delay amount (the injection restart time ignition timing delay amount) of the ignition timing in the fuel cut stop time injection restart control is constant, but the constant injection restart time ignition timing delay amount irrespective of the amount of fuel supplied to the engine at the start of the fuel injection causes the below described problem.

Specifically, too large a delay amount of the ignition timing with respect to the amount of fuel supplied to the engine in the fuel cut stop time injection restart control excessively reduces the output torque of the engine, and thus a driver performing the accelerating operation further opens a throttle valve for acceleration. If the driver further opens the throttle valve, the air/fuel ratio of the air/fuel mixture significantly becomes lean, which prevents acceleration of the engine and impairs operating performance or causes the engine to seize up. Such a state noticeably occurs when a fuel cut period which is a time between the start and the stop of the fuel cut is long.

In the case where a large amount of fuel is supplied to the engine at the restart of the fuel injection as in the case where the accelerating operation of the engine is performed immediately after the start of the fuel cut, too small a delay amount of the ignition timing may insufficiently reduce the output torque of the engine and cause a torque shock.

SUMMARY OF THE INVENTION

The present invention has an object to provide a fuel injection and ignition control method and a fuel injection and ignition control device of an engine that can restart fuel injection and control ignition timing while maintaining an air/fuel ratio of an air/fuel mixture in a proper range when an accelerating operation is performed during fuel cut, thereby eliminating the risk that operating performance is reduced or an engine seizes up.

The present invention is applied to a fuel injection and ignition control device of an engine that controls a fuel injection device that supplies fuel to the engine and an ignition device that ignites the engine. The fuel injection and ignition control device according to the present invention includes: fuel cut control means for stopping fuel injection from the fuel injection device that supplies fuel to the engine when it is detected that the engine is in a deceleration state; "fuel cut stop time injection restart control means" for controlling the fuel injection device so as to increase a fuel injection amount to be higher than a fuel injection amount in normal time by "a fuel cut stop time injection amount correction value" to restart the fuel injection when a predetermined fuel cut stop condition is met; "acceleration time injection amount increase control means" for controlling the fuel injection device so as to increase the fuel injection amount by "a first acceleration time injection amount correction value" when it is detected that an engine accelerating operation is performed; "acceleration time injection restart control means" for controlling the fuel injection device so as to increase the fuel injection amount to be higher than the fuel injection amount in normal time by a total injection amount correction value calculated by adding "a second acceleration time injection amount correction value" determined with respect to a fuel cut period and an engine operating state to the first acceleration time injection amount correction value to restart the fuel injection, when it is detected that the engine accelerating operation is performed during the fuel cut; and "injection restart time ignition control means" for controlling the ignition device so as to determine "an injection restart time ignition timing delay amount" with respect to the total injection amount correction value and a throttle valve opening degree and delay ignition timing from ignition timing in normal operation by the injection restart time ignition timing delay amount.

In a preferred aspect of the present invention, the acceleration time injection restart control means is comprised so as to search a second acceleration time injection amount correction value arithmetical operation map with respect to the number of combustion cycles performed in the engine during the fuel cut and the throttle valve opening degree of the engine to arithmetically operate the second acceleration time injection amount correction value, and the injection restart time ignition control means is comprised so as to search an injection restart time ignition timing delay amount arithmetical operation map with respect to the total injection amount correction value and the throttle valve opening degree to arithmetically operate the injection restart time ignition timing delay amount.

The present invention is also applied to a fuel injection and ignition control method of an engine for controlling a fuel injection device that supplies fuel to the engine and an ignition device that ignites the engine.

The fuel injection and ignition control method of an engine according to the present invention includes: a fuel cut control step of stopping fuel injection from the fuel injection device that supplies fuel to the engine when it is detected that the engine is in a deceleration state; "a fuel cut stop time injection restart control step" of controlling the fuel injection device so as to increase a fuel injection amount to be higher than a fuel injection amount in normal time by "a fuel cut stop time injection amount correction value" to restart the fuel injection when a predetermined fuel cut stop condition is met; "an acceleration time injection amount increase control step" of controlling the fuel injection device so as to increase the fuel injection amount by "a first acceleration time injection amount correction value" when it is detected that an engine accelerating operation is performed; "an acceleration time injection restart control step" of controlling the fuel injection device so as to determine "a second acceleration time injection amount correction value" with respect to a fuel cut period and an engine operating state and increase the fuel injection amount to be higher than the fuel injection amount in normal time by a total injection amount correction value calculated by adding the second acceleration time injection amount correction value to the first acceleration time injection amount correction value to restart the fuel injection, when it is detected that the engine accelerating operation is performed during the fuel cut; and an injection restart time ignition control step of determining "an injection restart time ignition timing delay amount" with respect to the total injection amount correction value and a throttle valve opening degree and delay ignition timing of the engine from ignition timing in normal operation by the injection restart time ignition timing delay amount.

The injection restart time ignition timing delay amount is preferably arithmetically operated so that the delay amount of the ignition timing of the engine does not exceed a set maximum value.

If fuel cut is performed in the deceleration of the engine, an intake pipe inner surface attaching fuel amount (an amount of fuel attached to an inner surface of an intake pipe to form a liquid film) is reduced with time. Thus, as described above, if the acceleration time injection restart control is performed to determine the second acceleration time injection amount correction value with respect to the fuel cut period and the engine operating state (for example, the throttle valve opening degree), and increase the fuel injection amount by the total injection amount correction value calculated by adding the second acceleration time injection amount correction value to the first acceleration time injection amount correction value to restart the fuel injection, a decrement of the intake pipe inner surface attaching fuel amount by the fuel cut and the engine operating state are reflected in the fuel injection amount, and an increment of the fuel injection amount at the restart of the injection in the accelerating operation during the fuel cut can be determined. This prevents the amount of fuel supplied to the engine from becoming insufficient or excessive when the accelerating operation of the engine is performed during the fuel cut, and allows the air/fuel ratio of the air/fuel mixture to be maintained in a proper range.

As described above, if the injection restart time ignition timing delay amount is determined according to the total injection amount correction value and the throttle valve opening degree in the acceleration time injection restart control to perform the injection restart time ignition control, a proper delay amount of the ignition timing at the restart of the fuel injection can be determined according to the amount of fuel supplied to the engine at the restart of the fuel injection. This eliminates the risks that an output torque of the engine is rapidly increased to cause a torque shock, or the air/fuel ratio of the air/fuel mixture becomes lean to impair operating performance of the engine or cause the engine to seize up.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF THE PREFERRED EMBODIMENTS

Figure 1:
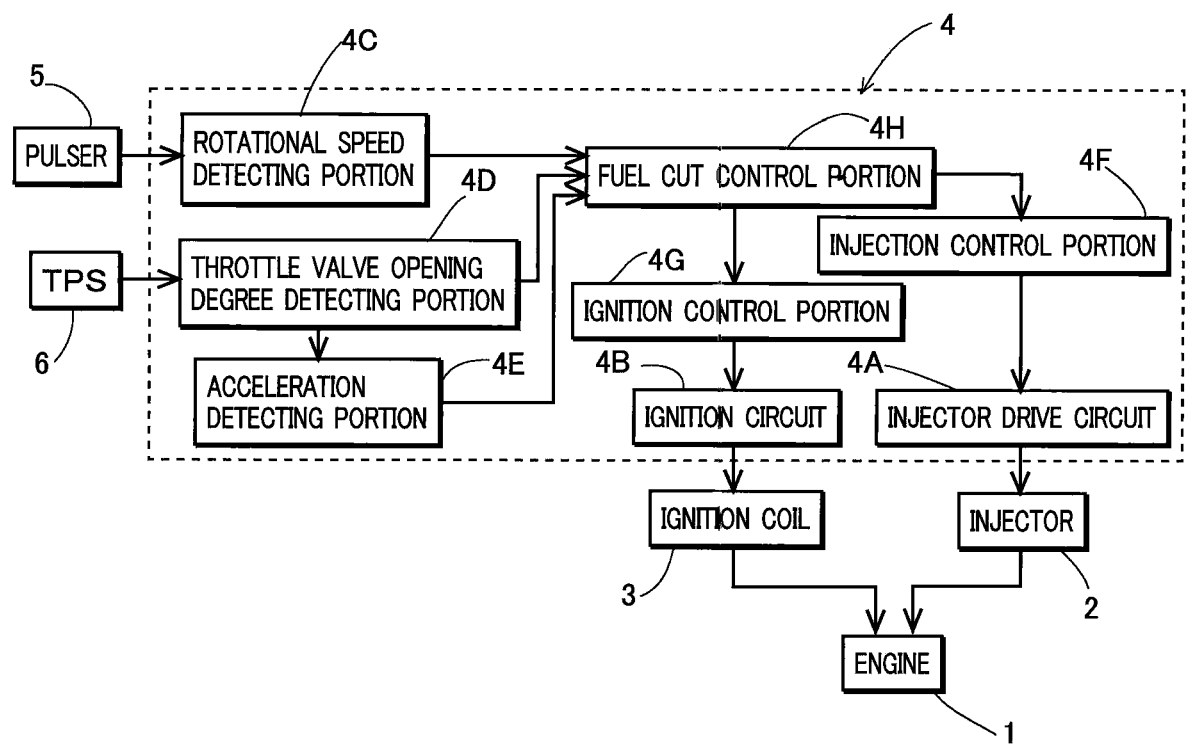
FIG. 1 is a block diagram of an entire construction of a fuel injection and ignition control device according to the present invention.

A preferred embodiment of the present invention will be described in detail with reference to the drawings.

A fuel injection and ignition control method of an engine according to the present invention is a method for controlling a fuel injection device that supplies fuel to the engine and an ignition device that ignites the engine. In the fuel injection and ignition control method of the present invention, besides general fuel injection and ignition control to control a fuel injection amount according to control conditions such as a throttle valve opening degree, a rotational speed, and a temperature of the engine, atmospheric pressure, or the like, and control ignition timing according to the rotational speed of the engine or the like, fuel cut control, fuel cut stop time injection restart control, acceleration time injection amount increase control, acceleration time injection restart control, and injection restart time ignition control are performed.

In the fuel cut control, the engine being in a deceleration state is regarded as a fuel cut performing condition, and fuel cut is performed when the fuel cut performing condition is met. The engine being in the deceleration state can be detected by detecting, for example, that a throttle valve opening is closed (a throttle valve opening degree is reduced), and/or a reduction rate of the rotational speed of the engine per unit time exceeds a set value.

In the fuel cut stop time injection restart control, when a predetermined fuel cut stop condition is met, the fuel injection device is controlled so as to increase the fuel injection amount to be higher than a fuel injection amount in normal time by a fuel cut stop time injection amount correction value to restart fuel injection.

The fuel cut stop condition is that the rotational speed of the engine becomes lower than a set fuel injection restart rotational speed during the fuel cut, or that the throttle valve is opened.

In the fuel cut stop time injection restart control, when the fuel cut stop condition is met, nonsynchronous injection is immediately performed at the time, or an amount of fuel injected in synchronous injection (injection performed at a predetermined crank angle position) is increased to increase the amount of fuel supplied to the engine.

In the acceleration time injection amount increase control, when it is detected that the throttle valve is opened a predetermined angle or larger and/or that an intake air amount of the engine is increased by a predetermined value or more, it is determined that an engine accelerating operation is performed, and when it is determined that the accelerating operation is performed, the fuel injection amount is increased by a first acceleration time injection amount correction value determined according to the degree of acceleration or an engine operating state (the throttle valve opening degree, the rotational speed, or the like) to increase the amount of fuel supplied to the engine.

The fuel injection amount can be increased by performing nonsynchronous injection of fuel by the determined increment of fuel, or increasing the amount of fuel injected in synchronous injection by the determined increment of fuel. The intake air amount can be determined by detection with an airflow sensor, estimation from the throttle valve opening degree and the rotational speed, or estimation from intake pipe pressure and the rotational speed.

In the acceleration time injection restart control, the fuel injection device is controlled so as to determine a second acceleration time injection amount correction value with respect to a fuel cut period and the engine operating state, and increase the fuel injection amount to be higher than the fuel injection amount in normal time by a total injection amount correction value calculated by adding the second acceleration time injection amount correction value to the first acceleration time injection amount correction value, when it is detected that the accelerating operation for accelerating the engine is performed during the fuel cut.

The fuel cut period can be determined from the number of combustion cycles performed in the engine during the fuel cut. The second acceleration time injection amount correction value can be arithmetically operated by searching a second acceleration time injection amount correction value arithmetical operation map with respect to the number of combustion cycles performed in the engine during the fuel cut and the throttle valve opening degree of the engine. The second acceleration time injection amount correction value arithmetical operation map summarizes the relationship between the number of combustion cycles, the throttle valve opening degree of the engine, and the second acceleration time injection amount correction value in a table. This map is previously experimentally prepared.

In the injection restart time ignition control, the ignition device of the engine is controlled so as to determine an injection restart time ignition timing delay amount with respect to the total injection amount correction value and the throttle valve opening degree in the acceleration time injection restart control, and delay ignition timing of the engine from ignition timing in normal operation by the delay amount.

The injection restart time ignition timing delay amount can be arithmetically operated by searching an injection restart time delay amount arithmetical operation map with respect to the total injection amount correction value and the throttle valve opening degree determined in the acceleration time injection restart control. The injection restart time delay amount arithmetical operation map summarizes the relationship between the total injection amount correction value, the throttle valve opening degree, and the injection restart time delay amount in a table. This map is previously experimentally prepared.

In the injection restart time ignition control, it is preferable that the injection restart time ignition timing delay amount does not exceed a set maximum value in order to prevent excessive delay of the ignition timing.

FIG. 1 shows an example of an entire construction of a fuel injection and ignition control device used for implementing the fuel injection and ignition control method according to the present invention. In FIG. 1, a reference numeral 1 denotes an engine (internal combustion engine) included in a vehicle or the like, 2 denotes an injector (electromagnetic fuel injection valve) that supplies fuel to the engine 1, 3 denotes an ignition coil that applies a high voltage for ignition to an ignition plug mounted to a cylinder of the engine, 4 denotes an electronic control unit, 5 denotes a pulser that generates a pulse signal at a predetermined crank angle position of the engine, and 6 denotes a throttle position sensor (TPS) that detects a position of a throttle valve of the engine.

The engine 1 may be a two-cycle engine or a four-cycle engine. The engine may have any number of cylinders. The injector 2 is a known one having an injection opening at a tip thereof, and including an injector body into which fuel is supplied under predetermined pressure, a valve that opens/closes the injection opening in the injector body, a solenoid (an electromagnet) that is provided in the injector body and drives the valve to an open position when excited, and a restart spring that biases the valve toward a close position. In the injector, the fuel is supplied from a fuel pump into the injector body under the predetermined pressure. The pressure of the fuel supplied into the injector body is maintained constant by a pressure regulator.

In such an injector, when a driving current of a predetermined level or higher is supplied to a solenoid coil, the valve is shifted to the open position to open the injection opening and inject fuel through the injection opening. The amount of fuel injected from the injector is determined by the pressure of the fuel supplied to the injector and a fuel injection period during which the injection opening is opened. The pressure of the fuel supplied to the injector is generally maintained constant, and thus the fuel injection amount is controlled by a fuel injection period during which the fuel is injected. In the embodiment, the injector 2 is mounted to the intake pipe of the engine 1, and injects fuel into a space downstream of the throttle valve in the intake pipe.

The ignition coil 3 has a primary coil and a secondary coil wound around an iron core, and the secondary coil is connected to an ignition plug mounted to the cylinder of the engine through a high-tension code.

The ECU 4 includes an injector drive circuit 4A, an ignition circuit 4B, a rotational speed detecting portion 4C, a throttle valve opening degree detecting portion 4D, an acceleration detecting portion 4E, an injection control portion 4F, an ignition control portion 4G, and a fuel cut control portion 4H. Among these components, the injector drive circuit 4A and the ignition circuit 4B are comprised of hardware circuits, and the rotational speed detecting portion 4C, the throttle valve opening degree detecting portion 4D, the acceleration detecting portion 4E, the injection control portion 4F, the ignition control portion 4G, and the fuel cut control portion 4H are comprised by the microprocessor performing predetermined programs.

The injector drive circuit 4A includes a switch that maintains an on state when an injection command signal is given, and applies a power supply voltage from an unshown power supply to a solenoid coil of the injector to supply a driving current to the solenoid coil during the on state of the switch. In this example, the fuel injection device is comprised of the injector drive circuit 4A and the injector 2.

The ignition circuit 4B causes a sudden change in a primary current of the ignition coil to induce a high voltage for ignition in a secondary coil of the ignition coil when an ignition signal is given. The ignition circuit may include a capacitor discharge type ignition circuit that includes an ignition capacitor provided on a primary side of the ignition coil and charged by an output of a charging power supply, and a discharge switch that conducts and discharges charges of the ignition capacitor through the primary coil of the ignition coil when the ignition signal is given, and induces a high voltage in the secondary coil of the ignition coil by discharging the charges of the ignition capacitor, or a current interrupting circuit that interrupts a primary current having passed through the primary coil of the ignition coil to induce a high voltage in the secondary coil of the ignition coil. In this example, the ignition device is comprised of the ignition circuit 4B and the ignition coil 3.

The rotational speed detecting portion 4C is comprised so as to arithmetically operate a rotational speed of the engine from a generation interval of pulses output by the pulser 5. The throttle valve opening degree detecting portion 4D is comprised so as to detect a throttle valve opening degree from an output of the throttle position sensor 6. The acceleration detecting portion 4E detects that an engine accelerating operation is performed when an increment of the throttle valve opening degree detected by the throttle valve opening degree detecting portion 4D reaches a predetermined level within a predetermined time.

The injection control portion 4F is comprised of for example, intake air amount detection or estimation means for detecting or estimating the intake air amount of the engine; basic injection period arithmetical operation means for arithmetically operating an injection period required for the air/fuel ratio of the air/fuel mixture to reach a predetermined value as a basic injection period with respect to the detected or estimated intake air amount; correction coefficient arithmetical operation means for arithmetically operating an injection period correction coefficient by which the basic injection period is multiplied for arithmetically operating an actual injection period with respect to various control conditions such as a cooling water temperature, an intake air temperature, the throttle valve opening degree, and the rotational speed of the engine, and atmospheric pressure; actual injection period arithmetical operation means for arithmetically operating an actual injection period by multiplying the basic injection period by the correction coefficient; and injection command signal generation means for generating an injection command signal given to the injector drive circuit 4A at synchronous injection timing detected using the pulses output by the pulser 5, and generating an injection command signal also at nonsynchronous injection timing as required.

The ignition control portion 4G is comprised of; for example, ignition timing arithmetical operation means for arithmetically operating ignition timing of the engine with respect to the control conditions of the rotational speed of the engine or the like; ignition timing clocking data arithmetical operation means for arithmetically operating ignition timing clocking data measured by an ignition timer for detecting the arithmetically operated ignition timing; and ignition signal generation mean for causing the ignition timer to start the measurement of the ignition timing clocking data at ignition timing detection start timing detected from the output of the pulser 5, and generating an ignition signal to be given to the ignition circuit when the ignition timer completes the measurement of the ignition timing clocking data.

Figure 2:
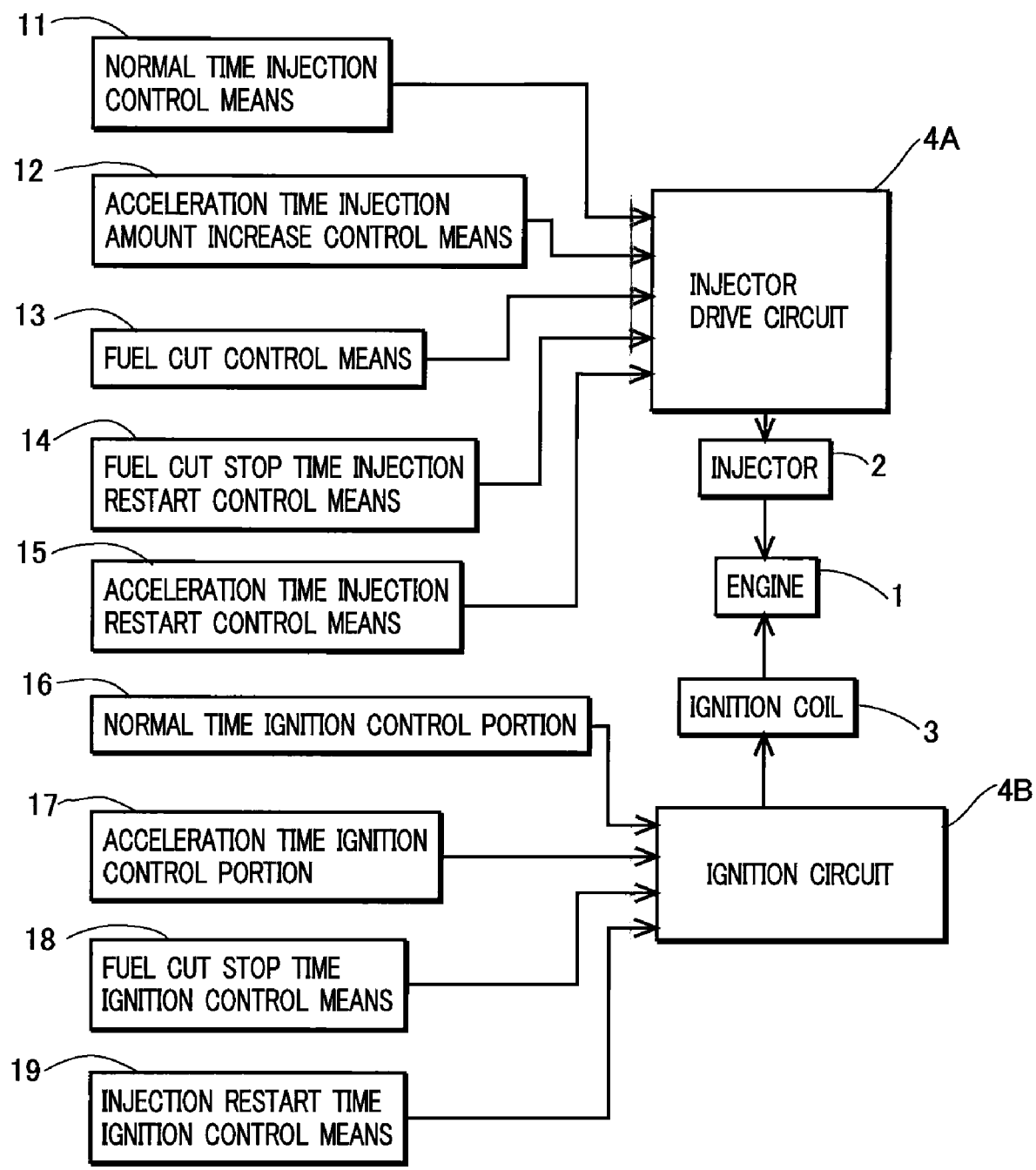
FIG. 2 is a block diagram of function achieving means comprised by a microprocessor in the fuel injection and ignition control device according to the present invention.

As shown in FIG. 2, the fuel cut control portion 4H is comprised of normal time injection control means 11 for controlling a fuel injection amount in normal operation of the engine; acceleration time injection amount increase control means 12 for controlling the fuel injection so as to increase the fuel injection amount by a first acceleration time injection amount correction value when it is detected that the engine accelerating operation is performed; fuel cut control means 13 for stopping the fuel injection from the fuel injection device when it is detected that the engine is in a deceleration state; fuel cut stop time injection restart control means 14 for performing control to increase the fuel injection amount to be higher than a fuel injection amount in normal time by a fuel cut stop time injection amount correction value to restart the fuel injection when a predetermined fuel cut stop condition is met; acceleration time injection restart control means 15 for performing acceleration time injection restart control to increase the fuel injection amount to be higher than the fuel injection amount in normal operation by a total injection amount correction value calculated by adding a second acceleration time injection amount correction value determined with respect to a fuel cut period and an engine operating state to the first acceleration time injection amount correction value, when it is detected that the accelerating operation is performed during the fuel cut; a normal time ignition control portion 16 that controls ignition timing in normal operation of the engine; an acceleration time ignition control portion 17 that controls the ignition timing to be ignition timing suitable for acceleration when the engine accelerating operation is performed; fuel cut stop time ignition control means 18 for performing control to delay the ignition timing of the engine from ignition timing in normal time by a fuel cut stop time ignition timing delay amount when the fuel cut stop condition is met; and injection restart time ignition control means 19 for performing injection restart time ignition control to determine an injection restart time ignition timing delay amount with respect to the total injection amount correction value and the throttle valve opening degree, and delay the ignition timing from the ignition timing in normal operation by the injection restart time ignition timing delay amount.

The second acceleration time injection amount correction value is arithmetically operated by searching a second acceleration time injection amount correction value arithmetical operation map with respect to the number of combustion cycles performed in the engine during the fuel cut and the throttle valve opening degree of the engine.

The injection restart time ignition timing delay amount is arithmetically operated by searching an injection restart time ignition timing delay amount arithmetical operation map with respect to the total injection amount correction value and the throttle valve opening degree.

Figure 3:
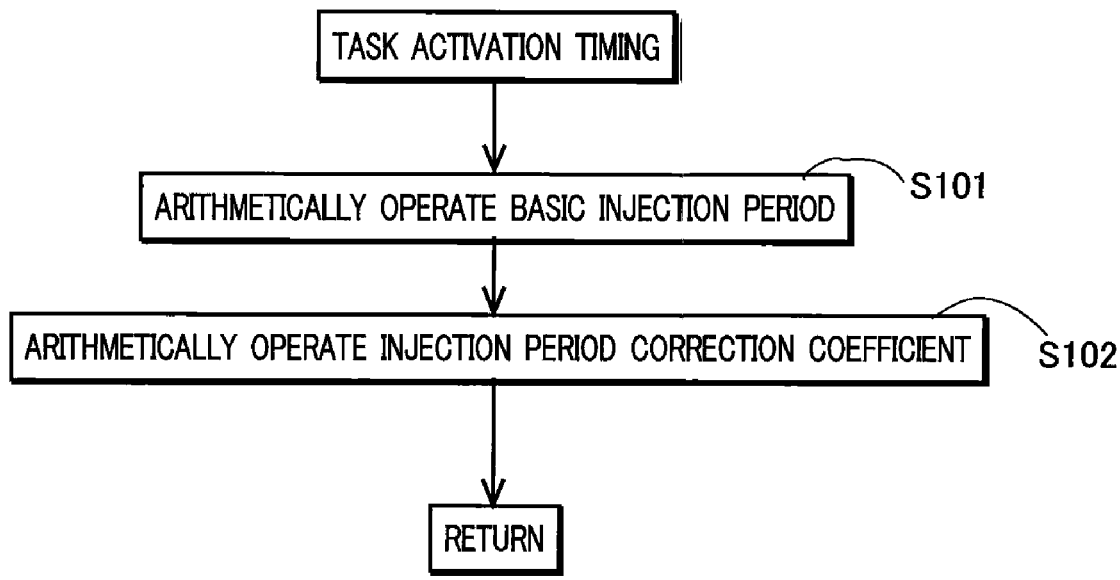
FIG. 3 is a flowchart showing an algorithm of an injection period arithmetical operation processing performed by the microprocessor in an embodiment of the present invention.
Figure 4:
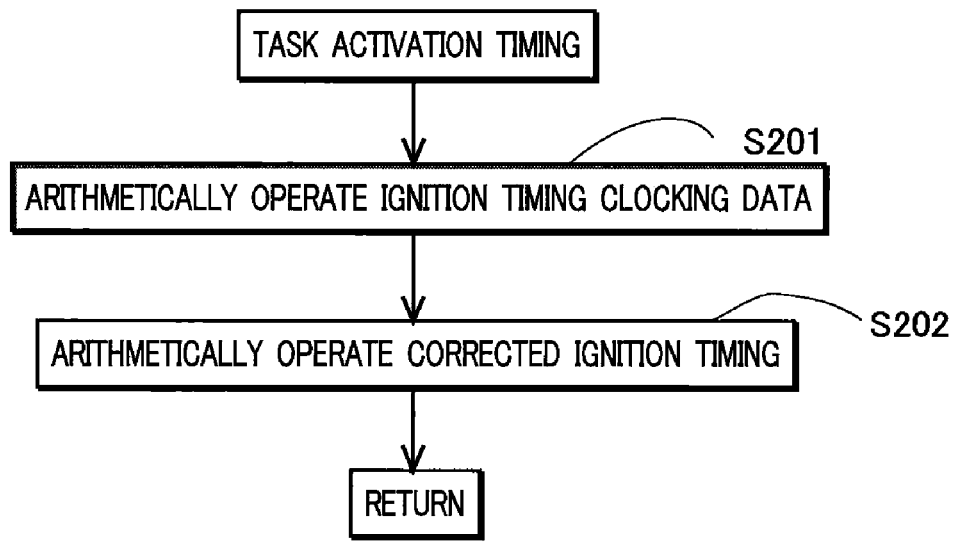
FIG. 4 is a flowchart showing an algorithm of an ignition timing arithmetical operation processing performed by the microprocessor in the embodiment of the present invention.
Figure 5:
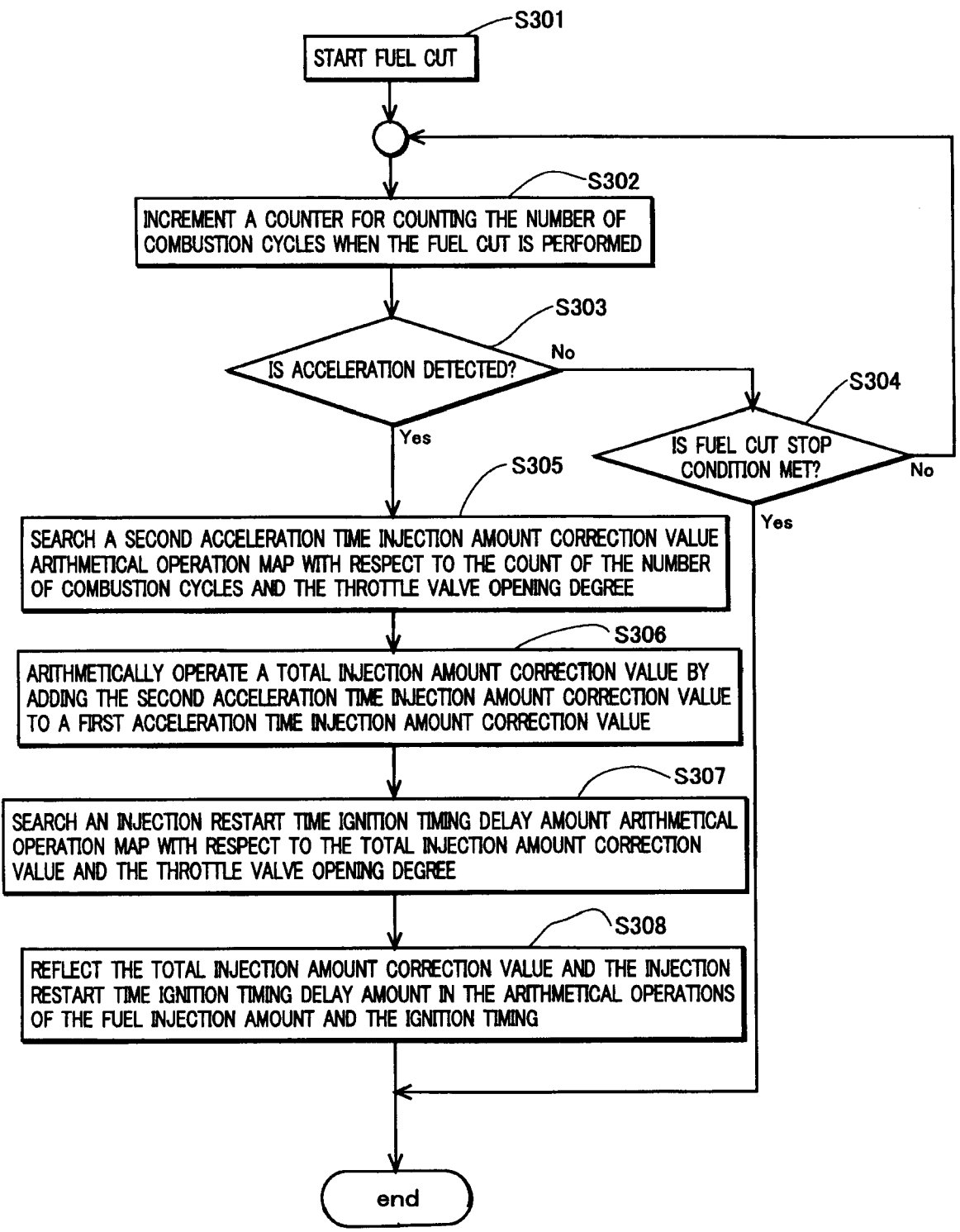
FIG. 5 is a flowchart showing an algorithm of a fuel cut interruption task processing performed by the microprocessor in the embodiment of the present invention.

FIGS. 3 to 5 show flowcharts of algorithms of tasks performed by the microprocessor for achieving the means in FIG. 2. FIG. 3 shows an algorithm of an injection period arithmetical operation task activated at task activation timing that comes at small time intervals. When the task is activated, first in Step S101, an injection period required for the air/fuel ratio of the air/fuel mixture to reach a predetermined value is arithmetically operated as a basic injection period with respect to an intake air amount, and in Step S102, a correction arithmetical operation is performed for multiplying the basic injection period by an injection period correction coefficient (arithmetically operated by a different task) arithmetically operated with respect to various control conditions to arithmetically operate an actual injection period.

The basic injection period arithmetical operation means is comprised by Step S101, and the actual injection period arithmetical operation means is comprised by Step S102.

FIG. 4 shows an algorithm of an ignition timing arithmetical operation task activated every time the task activation timing comes at small time intervals. When the task is activated, in Step S201, ignition timing clocking data is arithmetically operated with respect to various conditions. The ignition timing clocking data is arithmetically operated in the form of a time required for a crankshaft of the engine to rotate from a reference crank angle position (a crank angle position where the pulser 5 generates a predetermined pulse) to an ignition position (a crank angle position for ignition) at a rotational speed at the time.

After the ignition timing clocking data is arithmetically operated with respect to various conditions in Step S201, the process moves to Step S202, and ignition timing clocking data is arithmetically operated that is corrected by adding or subtracting a correction value (arithmetically operated by a different task processing) for delaying or advancing the ignition timing to or from the ignition timing clocking data arithmetically operated in Step S202. The ignition timing arithmetical operation means is comprised by Steps S201 and S202 in FIG. 4.

FIG. 5 shows a fuel cut interruption task processing performed once for one combustion cycle at interruption timing (timing before timing for synchronous injection) synchronized with rotation of the engine when a fuel cut performing condition is met (when it is detected that the engine is in a deceleration state).

When the processing is started, in Step S301, fuel cut control is started, and fuel injection is stopped at succeeding synchronous injection timing. The engine being in the deceleration state is detected by detecting, for example, that the throttle valve is closed, and/or a reduction rate of the rotational speed of the engine per unit time exceeds a set value.

Then, in Step S302, a count of a counter for counting the number of combustion cycles when the fuel cut is performed is incremented, and in Step S303, it is determined whether the engine accelerating operation is performed. When it is determined that the accelerating operation is not performed, the process proceeds to Step S304, and it is determined whether a fuel cut stop condition is met. When it is determined that the fuel cut stop condition is not met, the process returns to Step S302. When it is determined in Step S304 that the fuel cut stop condition is met, this processing is finished without performing any processing thereafter. When the fuel cut stop condition is met (when the fuel cut performing condition is not met), a fuel cut stop time injection amount correction value is arithmetically operated by a different task for increasing an injection amount at the restart of the fuel injection to be higher than an injection amount under the same condition in normal time, and the correction value is reflected in the injection period. Also, fuel cut stop time ignition control is performed to delay the ignition timing of the engine from the ignition timing in normal time by a fuel cut stop time ignition timing delay amount.

When it is detected that the engine accelerating operation is performed, a first acceleration time injection amount correction value for providing an increment of the fuel injection amount at the acceleration is arithmetically operated by a different task.

The fuel cut stop condition is that the rotational speed of the engine becomes lower than the set fuel injection restart rotational speed during the fuel cut, or that the throttle valve is opened.

When it is determined in Step S303 that the engine accelerating operation is performed, the process proceeds to Step S305, a second acceleration time injection amount correction value arithmetical operation map is searched with respect to the count of the number of combustion cycles when the fuel cut is performed and the throttle valve opening degree to arithmetically operate a second acceleration time injection amount correction value that is higher than a fuel cut stop time injection amount correction value in the case where the fuel injection is restarted without the accelerating operation being performed in consideration of accelerating the engine, and in Step S306, a first acceleration time injection amount correction value arithmetically operated by a different task is added to the second acceleration time injection amount correction value to arithmetically operate a total injection amount correction value. The second acceleration time injection amount correction value becomes high when the count of the number of combustion cycles when the fuel cut is performed is high, and becomes low when the count of the number of combustion cycles when the fuel cut is performed is low. The second acceleration time injection amount correction value also becomes high when the throttle valve opening degree is high, and becomes low when the throttle valve opening degree is low.

Then, in Step S307, an injection restart time ignition timing delay amount arithmetical operation map is searched with respect to the total injection amount correction value and the throttle valve opening degree to arithmetically operate an injection restart time ignition timing delay amount, and in Step S308, the total injection amount correction value and the injection restart time ignition timing delay amount are reflected in the arithmetical operations of the fuel injection amount and the ignition timing performed in Step S102 in FIG. 3 and Step S202 in FIG. 4.

The fuel cut control means is mainly comprised by Step S301 in FIG. 5, and the acceleration time injection restart control means 15 is comprised by Steps S302 to S306 and S308 and the task processing in FIG. 3. The injection restart time ignition control means 19 is mainly comprised by Steps S307 and S308 in FIG. 5 and the task processing in FIG. 4.

As described above, in the control method of the present invention, when it is detected that the engine is in the deceleration state, the task in FIG. 5 is performed to perform the fuel cut for stopping the fuel injection from the fuel injection device that supplies fuel to the engine, and when the predetermined fuel cut stop condition is met, the fuel cut stop time injection restart control to increase the fuel injection amount to be higher than the fuel injection amount in normal time by the fuel cut stop time injection amount correction value to restart the fuel injection, and the fuel cut stop time ignition control to delay the ignition timing of the engine from the ignition timing in normal time by the fuel cut stop time ignition timing delay amount are performed. When it is detected that the engine accelerating operation is performed, the acceleration time injection amount increase control is performed to control the fuel injection device so as to increase the fuel injection amount to be higher than the fuel injection amount in normal time by the acceleration time injection amount correction value.

In the fuel cut stop time injection restart control, when the fuel cut stop condition is met, the nonsynchronous injection is immediately performed at the time, or the amount of fuel injected in the synchronous injection (injection performed at a predetermined crank angle position) is increased to increase the amount of fuel supplied to the engine.

In the acceleration time injection amount increase control, when it is determined that the engine accelerating operation is performed from the throttle valve being opened and/or the intake air amount of the engine being increased, the nonsynchronous injection is performed by the increment of the amount of fuel determined according to the degree of acceleration or the engine operating state (the throttle valve opening degree, the rotational speed, or the like), or the amount of fuel injected in the synchronous injection is increased to increase the amount of fuel supplied to the engine. The intake air amount is detected by an airflow sensor, estimated from the throttle valve opening degree and the rotational speed, or estimated from the intake pipe pressure and the rotational speed.

When it is detected that the accelerating operation is performed during the fuel cut, the second acceleration time injection amount correction value is determined with respect to the fuel cut period and the engine operating state, the second acceleration time injection amount correction value is added to the first acceleration time injection amount correction value to be the total injection amount correction value, the fuel injection amount is increased by the total injection amount correction value to perform the injection restart time injection control, and the injection restart time ignition timing delay amount is determined with respect to the total injection amount correction value and the throttle valve opening degree to perform the injection restart time ignition control.

Among the function achieving means in FIG. 2, the normal time injection control means 11 for controlling the fuel injection amount in normal operation of the engine, the acceleration time injection amount increase control means 12 for controlling the fuel injection device so as to increase the fuel injection amount by the first acceleration time injection amount correction value when it is detected that the engine accelerating operation is performed, the normal time ignition control portion 16 that controls the ignition timing in normal operation of the engine, and the acceleration time ignition control portion 17 that controls the ignition timing to be ignition timing suitable for acceleration when the engine accelerating operation is performed are embodied by different processings from those in FIGS. 3 to 5. These processings may be performed by known methods, and descriptions thereof will be omitted.

In the above described embodiment, when the predetermined fuel cut stop condition is met, the fuel cut stop time injection restart control to increase the fuel injection amount to be higher than the fuel injection amount in normal time by the fuel cut stop time injection amount correction value to restart the fuel injection, and the fuel cut stop time ignition control to delay the ignition timing of the engine from the ignition timing in normal time by the fuel cut stop time ignition timing delay amount are performed, but the fuel cut stop time ignition control is not essential to the present invention.

Thus, in FIG. 2, it may be allowed that the fuel cut stop time ignition control means 18 is omitted, and when the predetermined fuel cut stop condition is met, the fuel cut stop time injection restart control only is performed to increase the fuel injection amount to be higher than the fuel injection amount in normal time by the injection cut stop time injection amount correction value to restart the fuel injection.

As described above, according to the present invention, the fuel injection amount is increased by the total injection amount correction value calculated by adding the second acceleration time injection amount correction value determined with respect to the fuel cut period and the engine operating state to the correction value that provides the increment of the fuel injection amount in the acceleration time increase control, to perform the fuel cut stop time injection restart control. Thus, the decrement of the intake pipe inner surface attaching fuel amount by the fuel cut and the engine operating state can be always reflected to determine the increment of the fuel injection amount at the restart of the fuel injection. This prevents the amount of fuel supplied to the engine from becoming insufficient or excessive when the engine accelerating operation is performed during the fuel cut, and allows the air/fuel ratio of the air/fuel mixture to be maintained in a proper range to increase operating performance of the engine.

As described above, if the injection restart time ignition timing delay amount is determined according to the total injection amount correction value and the throttle valve opening degree in the acceleration time injection restart control to control the ignition timing when the accelerating operation is detected during the fuel cut and the fuel injection is restarted, a proper delay amount of the ignition timing at the restart of the fuel injection can be determined according to the amount of fuel supplied to the engine at the restart of the fuel injection. This eliminates the risks that an output torque of the engine is rapidly increased to cause a torque shock, or the air/fuel ratio of the air/fuel mixture becomes lean to impair operating performance of the engine or cause the engine to seize up.

Although the preferred embodiment of the invention has been described and illustrated with reference to the accompanying drawings, it will be understood by those skilled in the art that it is by way of examples, and that various changes and modifications may be made without departing from the spirit and scope of the invention, which is defined only to the appended claims.

What is claimed is:

1. A fuel injection and ignition control device of an engine that controls a fuel injection device that supplies fuel to the engine and an ignition device that ignites said engine, comprising:
   fuel cut control means for stopping fuel injection from said fuel injection device when it is detected that the engine is in a deceleration state;
   fuel cut stop time injection restart control means for controlling said fuel injection device so as to increase a fuel injection amount to be higher than a fuel injection amount in normal time by a fuel cut stop time injection amount correction value to restart said fuel injection when a predetermined fuel cut stop condition is met;
   acceleration time injection amount increase control means for controlling said fuel injection device so as to increase said fuel injection amount by a first acceleration time injection amount correction value when it is detected that an engine accelerating operation is performed;
   acceleration time injection restart control means for controlling said fuel injection device so as to increase said fuel injection amount to be higher than the fuel injection amount in normal time by a total injection amount correction value calculated by adding a second acceleration time injection amount correction value determined with respect to a fuel cut period and an engine operating state to said first acceleration time injection amount correction value to restart the fuel injection, when it is detected that said engine accelerating operation is performed during said fuel cut; and
   injection restart time ignition control means for controlling said ignition device so as to determine an injection restart time ignition timing delay amount with respect to said total injection amount correction value and a throttle valve opening degree and delay ignition timing from ignition timing in normal operation by said injection restart time ignition timing delay amount.

2. The fuel injection and ignition control device according to claim 1, wherein said acceleration time injection restart control means is comprised so as to search a second acceleration time injection amount correction value arithmetical operation map with respect to the number of combustion cycles performed in said engine during said fuel cut and the throttle valve opening degree of said engine to arithmetically operate said second acceleration time injection amount correction value, and
   said injection restart time ignition control means is comprised so as to search an injection restart time ignition timing delay amount arithmetical operation map with respect to said total injection amount correction value and said throttle valve opening degree to arithmetically operate said injection restart time ignition timing delay amount.

3. A fuel injection and ignition control method of an engine for controlling a fuel injection device that supplies fuel to the engine and an ignition device that ignites said engine, comprising:
   a fuel cut control step of stopping fuel injection from the fuel injection device that supplies fuel to said engine when it is detected that the engine is in a deceleration state;
   a fuel cut stop time injection restart control step of controlling said fuel injection device so as to increase a fuel injection amount to be higher than a fuel injection amount in normal time by a fuel cut stop time injection amount correction value to restart said fuel injection when a predetermined fuel cut stop condition is met;
   an acceleration time injection amount increase control step of controlling said fuel injection device so as to increase said fuel injection amount by a first acceleration time injection amount correction value when it is detected that an engine accelerating operation is performed;
   an acceleration time injection restart control step of controlling said fuel injection device so as to determine a second acceleration time injection amount correction value with respect to a fuel cut period and an engine operating state and increase the fuel injection amount to be higher than said fuel injection amount in normal time by a total injection amount correction value calculated by adding said second acceleration time injection amount correction value to said first acceleration time injection amount correction value to restart the fuel injection, when it is detected that said engine accelerating operation is performed during said fuel cut; and
   an injection restart time ignition control step of determining an injection restart time ignition timing delay amount with respect to said total injection amount correction value and a throttle valve opening degree and delay ignition timing of said engine from ignition timing in normal operation by said injection restart time ignition timing delay amount.

4. The fuel injection and ignition control method according to claim 3, wherein said second acceleration time injection amount correction value is arithmetically operated by searching a second acceleration time injection amount correction value arithmetical operation map with respect to the number of combustion cycles performed in said engine during said fuel cut and the throttle valve opening degree of said engine, and
   said injection restart time ignition timing delay amount is arithmetically operated by searching an injection restart time ignition timing delay amount arithmetical operation map with respect to said total injection amount correction value and the throttle valve opening degree of said engine.

5. The fuel injection and ignition control method according to claim 4, wherein said injection restart time ignition timing delay amount is arithmetically operated so that the delay amount of the ignition timing of said engine does not exceed a set maximum value.

* * * * *

UNITED STATES PATENT AND TRADEMARK OFFICE
CERTIFICATE OF CORRECTION

PATENT NO. : 7,503,308 B2 Page 1 of 1
APPLICATION NO. : 11/970117
DATED : March 17, 2009
INVENTOR(S) : Kitagawa It is certified that error appears in the above-identified patent and that said Letters Patent is hereby corrected as shown below:

In column 8, line 42, please insert --;-- after the word "of" and before the word "normal".

In column 10, line 20, please start a new paragraph after the "." and before the word -When-.

Signed and Sealed this

Twenty-ninth Day of June, 2010

David J. Kappos
*Director of the United States Patent and Trademark Office*